Dec. 30, 1941. E. DORNHÖFER 2,268,135
CONTROL DEVICE FOR MACHINE TOOL CHUCKS
Filed April 2, 1940

Inventor:
EWALD DORNHÖFER

By: Richards & Geier
Attorneys:

Patented Dec. 30, 1941

2,268,135

UNITED STATES PATENT OFFICE 2,268,135

CONTROL DEVICE FOR MACHINE TOOL CHUCKS

Ewald Dornhöfer, Magdeburg, Germany, assignor to Magdeburger Werkzeug Machinenfabrik G. m. b. H., Magdeburg, Germany, a limited-liability company of Germany Application April 2, 1940, Serial No. 327,467
In Germany February 28, 1939

3 Claims. (Cl. 29—38)

This invention relates to a control device for machine tool chucks and refers more particularly to a device for clamping or holding work pieces upon a movable work piece support which is provided with several clamping devices.

The invention is concerned with machine tools of the type wherein a number of independent tools movable in the direction of their feed, such as turning tools, carry out the same operation one after the other upon several work pieces. The work pieces are held upon a movable work piece support which usually has the form of a rotary table adapted to move step wise from one operating position to the next one. The support is provided with a corresponding number of chucks or holding devices for the work pieces. An immovable drive is situated close to the work piece support and may be coupled with the jaws or other clamping means of each holding device. The present invention is particularly concerned with means operating this drive.

An object of the present invention is to construct a device which may be operated to clamp a work piece by a simple manipulation and in such a short time that the clamping of the work pieces and the freeing of the clamped work pieces can be adapted to the progress of movement of said rotary table in the course of its step wise rotation.

Another object is to provide a device which can be manipulated to cause various parts of a clamping device to move automatically during the clamping of the work pieces and the freeing of the clamped work pieces.

A further object is the provision of a pressure-operated control device for machine tool chucks which is so included in the lubrication system of the machine tool that the drive circulating the lubricant throughout the machine may be used either for its original purpose or for the purpose of operating the control device.

Other objects of the present invention will become apparent from the following specification.

The objects of the present invention may be realized through the provision of a pressure-operated control device or drive for the gripping jaws or other movable means used for clamping a work piece. Separate groups of jaws are located in each place wherein a work piece is to be affixed. The actuating elements of the drive are connected with the actuating elements of a coupling which is also operated by the pressure medium and by means of which the drive may be connected with the devices operating the groups of gripping jaws. The drive is so constructed that the jaws are moved automatically during both the clamping and the unclamping movements once the drive is operated. Preferably, a device is provided by means of which the pump which circulates the lubricant through the machine tool, can be operated selectively to transmit the lubricant to its container for lubricating purposes, or to cause the lubricant to operate the actuating elements of the drive.

Thus, the pump of the lubricating system merely receives an additional task, so that no other pressure creating means are necessary. The flow of the lubricant to its container is interrupted only for a short time while the clamping means are being operated.

The invention will appear more clearly from the following detailed description when taken in connection with the accompanying drawing, showing by way of example a preferred embodiment of the inventive idea.

Figure 1:
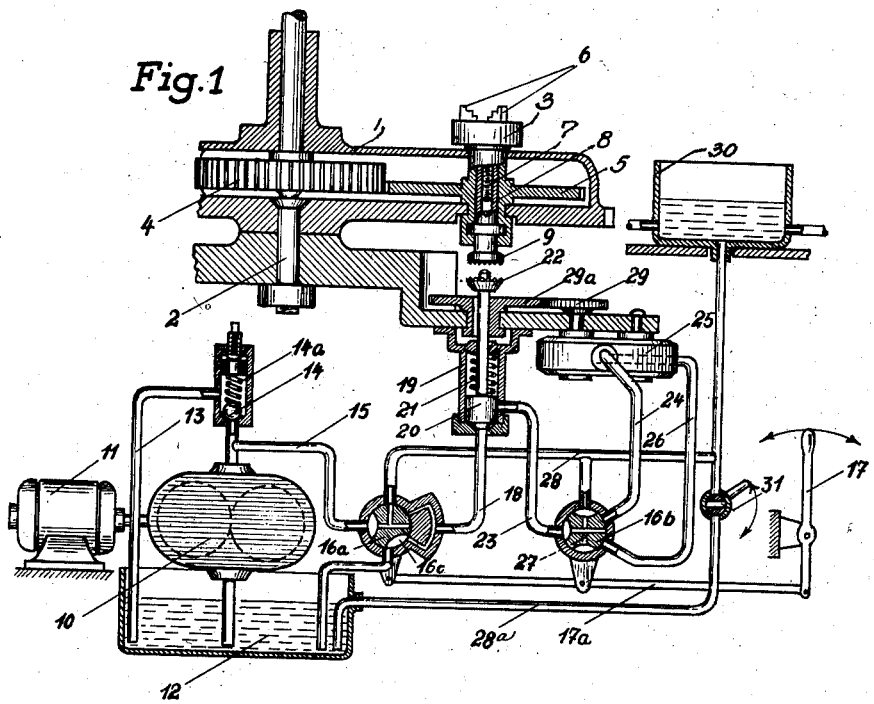
Figure 1 is a diagram illustrating partly in side elevation and partly in section a control device constructed in accordance with the principles of the present invention.

Figure 1 of the drawing shows a support 1 of a machine tool. This support is adapted to carry a plurality of work pieces which are held upon the support 1 by the chucks 3. Only one of these chucks is illustrated in the drawing.

The machine tool is provided with suitable tools which move downwardly to engage a work piece and to perform the necessary operations thereon, whereupon the tools are raised from the work pieces. The present invention is not concerned with this part of the machine tool, and it is not illustrated in the drawing.

The work piece support 1 is rotatably mounted upon a shaft 2 and is driven by any suitable means (not shown).

Each of the chucks 3 includes three jaws 6 which are movable radially toward and away from each other by a mechanism which is well known in the art and is not illustrated in detail. This mechanism includes a threaded bolt 7 situated within a nut or sleeve 8. The sleeve 8 is firmly connected with the gear wheel 5 which is rotatably mounted in the table 1 and is situated in a hollow chamber formed within the table. The wheel 5 meshes with a gear wheel 4 which is rotatable by any suitable means not shown in the drawing. The wheels 4 and 5 are parts of a drive rotating the chuck 3 about its vertical axis and thereby causing a rotation of a work piece while it is subjected to the action of a tool.

The sleeve 8 is firmly connected with a coupling element 9 which may be engaged by a movable coupling element 22. The coupling element 22 constitutes a part of the drive which is used to actuate the jaws 6 of the chucks 3 and which is situated below these clamps at a place wherein the removal of the work pieces and their clamping take place. This device is firmly mounted within the frame work or support of the machine tool and is driven or actuated by a fluid under pressure, such as lubrication oil.

The operating fluid is circulated by a pump 10 which is driven by an electro-motor 11. The fluid is situated in a container 12 which is located below the pump. A pipe leading from the pump 10 carries a regulatable pressure valve comprising a valve body 14 which is engaged by a spring 14a and is situated within a cylinder connected by a return flow pipe 13 with the liquid within the container 12.

The fluid transmitting pipe 15 of the pump 10 leads to a double steering valve, the valve bodies 16a and 16b of which are provided with passages extending actually one next to the other in parallel planes. For simplicity's sake, the valve bodies 16a and 16b have been shown in the drawing as being situated one next to the other and as being coupled with each other, although in actual practice, they may constitute a single member.

In the construction shown in the drawing, the valve bodies 16a and 16b are operated by levers which are interconnected by a rod 17a. The rod 17a is pivotally connected with one end of a lever 17 which is pivoted intermediate its ends and the opposite end of which is provided with a handle.

The cylinder containing the valve body 16a carries one end of the pipe 15 and is also in communication with one end of a pipe 18, the opposite end of which leads to the bottom of a cylinder 19. The cylinder 19 contains a piston 20 which is pressed downwardly by a spring 21 and the piston rod of which is firmly connected with the movable coupling element 22, cooperating with the coupling element 9.

A pipe 23 connects the cylinder 19 with the cylinder containing the valve body 16b. A pipe 24 connects the same cylinder with a motor 25 which is operated by a liquid and which may consist of a turbine or the like.

The rotor of the motor 25 is firmly mounted upon a shaft which extends outside of the casing of the motor. A gear wheel 29 is keyed upon this shaft and meshes with a gear wheel 29a.

The gear wheel 29a is mounted upon the rod of the piston 20 and is slidable upon this rod, so that an upward movement of the rod will not cause any movement of the gear wheel 29a. However, the gear wheel 29a is keyed upon the piston rod, so that a rotation of the gear wheel will be transmitted to the rod and the coupling member 22.

A pipe 26 leading to the cylinder of the valve body 16b, is also connected with the motor 25.

A pipe 28 connects the cylinders of the valve bodies 16a and 16b with each other and with a liquid container 30.

As already stated, in multiple tool machines, it is advisable to combine the described drive with the usual lubricating system. Then lubricating oil is used as the operating medium under pressure and the pump 10 is then the same pump which is used to distribute the lubricant throughout the machine. This pump operates in the usual manner while the jaws 6 of the chucks 3 are not being actuated.

A pipe 28a is connected in parallel to the pipe 28 and is used to connect the container 30 with the container 12. The pipe 28a is provided with a valve 31.

The operation of the device is as follows:

When the device is situated in the position shown in Figure 1, the pump 10 transmits oil through the pipe 15 into the cylinder of the valve body 16a. The valve body 16a is provided with passages which, at that time, connect the pipe 15 with the pipe 28, so that oil can flow through the pipe 28 into the container 30 and will be distributed throughout the machine by the usual lubrication system.

Figure 2:
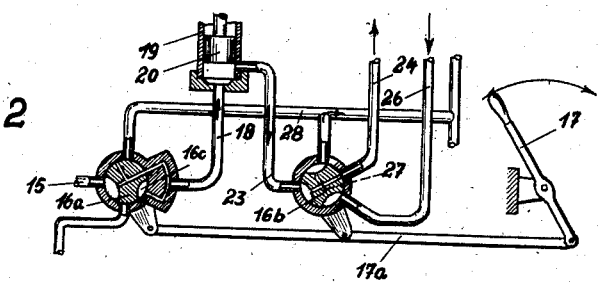
Figure 2 shows a part of the device illustrated in Figure 1 in a different position.

When the rotation of the table 1 about its axle 2 is terminated, the operator actuates the lever 17 and moves it from the position shown in Figure 1 to the position shown in Figure 2.

Then the passages of the valve body 16a will be so located that the oil driven by the pump 10 and flowing through the pipe 15 to the valve body 16a will flow through these passages to the pipe 18. Oil collected by the pipe 18 in the cylinder 19 below the piston 21 will gradually raise the piston along with its piston rod and the coupling member 22, thereby compressing the spring 21, until the coupling 22 engages the coupling element 9.

The piston 20 frees the pipe 23 in the course of this upward movement, so that oil can flow through the pipe 18 and the cylinder 19 to the pipe 23 and the cylinder of the valve body 16b. The valve body 16b is then in such position that the oil can flow through the passages of this valve body to the pipe 24. Oil flowing through the pipe 24 reaches the motor 25 and proceeds to turn the rotor of the motor 25 in a predetermined direction.

It is apparent that when the rotor is turned in one direction, its rotation is transmitted by the rotor shaft, the gear wheels 29 and 29a, the rod of the piston 20 and the coupling 22, 9 to the device 7, 8, which will move the jaws 6 relatively to each other in a predetermined direction. When the rotor of the motor 25 is rotated in the opposite direction, the jaws 6 will be also moved in an opposite direction.

The device is so constructed that when the rotor of the motor 25 is driven by oil flowing through the pipe 24, the jaws 6 will be moved outwardly and away from each other, so that they will clamp a hollow work piece having, for instance, the form of a cylindrical body and mounted upon the jaws.

The oil leaves the motor 25 through the pipe 26 which leads to the cylinder of the valve body 16b provided with a passage 27. In the position shown in Figure 2, the passage 27 connects the pipe 26 with the pipe 28, so that oil returning from the motor can flow through the pipe 28 to the container 30.

The movement of the jaws 6 terminates as soon as they have clamped the work piece. Then the rotation of the device 7, 8, of the coupling 9, 22, and of the gear wheels 29a and 29 is also terminated, so that the rotation of the motor 25 is stopped. Then the pump 10 cannot transmit more oil through the pipe 15, so that the pressure of the oil is increased until it raises the valve body 14 and compresses the spring 14a. Then the oil can flow from the pump 10 and through the cylinder of the valve body 14 and the pipe 13 back into the container 12. By varying the strength of the spring 14a it is possible to vary the extent of the oil pressure causing the raising of the valve body 14 and thus to vary the amount of pressure exerted by the jaws 6 upon the work piece.

When the clamping of the work piece has been completed, the lever 17 is moved from the position shown in Figure 2 back into the position shown in Figure 1, so that the valve bodies 16a and 16b again assume the positions shown in Figure 1. In these positions, the supply of oil to the piston 20 is interrupted and oil situated in the cylinder 19 below the piston 20 can flow back through the pipe 18 to the cylinder of the valve body 16a and thence through the chamber 16c to the container 12.

The spring 19 will then move the piston 20 downwardly until it returns to the position shown in Figure 1. The piston rod and the coupling element 22 move downwardly along with the piston 20, so that the coupling 9, 22 is now disconnected and the jaws 6 remain in the clamped position.

The table 1 is now devoid of connection with the drive actuating the chucks, so that the table 1 can now be rotated again without any interference from the actuating drive.

As already stated, the table 1 is preferably moved step wise until the next chuck 3 is moved to a position above the coupling element 22.

Figure 3:
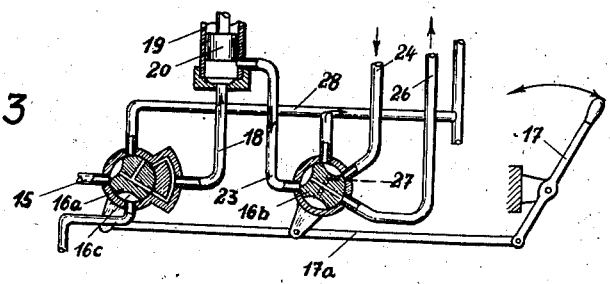
Figure 3 is similar to Figure 2 and shows the parts in another position.

In order to free a clamped work piece, the lever 17 is moved in the opposite direction until the valve bodies 16a and 16b and the lever 17 assume the position shown in Figure 3.

Oil is then transmitted by the pump 10 through the pipe 15 and the passages formed in the valve body 16a to the pipe 18 and the cylinder 19, so that the piston 20 is raised again until the coupling member 9 is engaged by the coupling member 22. This movement of the piston 20 will cause oil to flow through the cylinder 19 and the pipe 23 to the valve body 16b. In the position shown in Figure 3 the passages of the valve body 16b connect the pipe 23 with the pipe 26, so that oil will be supplied now to the motor 25 through the pipe 26. The oil flowing into the motor 25 through the pipe 26 will rotate the rotor of the motor 25 in a direction opposite to that in which it was rotated by the oil flowing through the pipe 24. The shaft of the rotor, the gear wheels 29 and 29a and the coupling 22, 9, will now actuate the jaw moving device 7, 8 in the opposite direction, so that the jaws 6 will move radially towards each other, thereby freeing the work piece. This movement is terminated by the operator by moving the lever 17 back to its middle position shown in Figure 1.

As already stated, in the position shown in Figure 1, i. e. in the interval between the actuation of the jaws 6, the oil supplied by the pump 10 to the valve bodies 16a and 16b does not flow either to the cylinder 19 or to the motor 25, but is transmitted by the pipe 28 to the container 30 and thence flows to these parts of the machine which are to be lubricated.

The valve 31 is opened to provide a return flow of the oil from the container 30 to the container 12 through the pipe 28a when too much oil is collected in the container 30.

It should be noted that during the operation of the jaws 6 and while the valve bodies 16a and 16b are situated in the positions shown in Figure 2 or Figure 3, oil leaving the motor 25 through the pipe 24 or the pipe 26 can reach the pipe 28 and thence flow to the container 30, provided that the valve 31 is closed.

It is apparent that the specific illustration shown above has been given by way of illustration and not by way of limitation, and that the structures above described are subject to wide variations and modifications without departing from the scope or intent of the invention. All of such variations and modifications are to be included within the scope of the present invention.

What is claimed is:

1. In a machine tool having a clamping device comprising movable jaws, rotatable means carrying said jaws and moving them toward and away from each other, and a coupling element connected with said jaw-moving means; a drive for said clamping device, said drive comprising a rotatable and reciprocable coupling element adapted to engage the coupling element of said clamping device, pressure-operated means connected with the coupling element of said drive for reciprocating the same, a steering valve connected with said coupling-reciprocating means, a fluid-operated reversible motor, means connecting said motor with the coupling element of said drive for rotating the same, another steering valve connected with said motor for supplying fluid thereto, fluid transmitting means operatively connecting said coupling-reciprocating means with the second-mentioned steering valve to transmit fluid under pressure to the second-mentioned steering valve when said coupling-reciprocating means are actuated, and means connected with the first-mentioned steering valve for supplying fluid under pressure thereto.

2. In a machine tool having a clamping device comprising movable jaws, rotatable means carrying said jaws and moving them toward and away from each other, and a coupling element connected with said jaw-moving means; a drive for said clamping device, said drive comprising a rotatable coupling element which is movable toward the coupling element of said clamping device to engage the same, and away from it, means connected with the coupling element of said drive for moving it away from the coupling element of said clamping device, a steering valve for the coupling-moving means, pressure-operated means connected with the coupling element of said drive for rotating the same, a steering valve for the coupling-rotating means, fluid transmitting means connecting the second-mentioned steering valve with said coupling-rotating means, fluid-transmitting means connecting the first-mentioned steering valve with the second-mentioned steering valve and connected to said coupling-moving means to cause the fluid to move the coupling element of said drive toward the coupling element of said clamping device and to engage the latter, a source of fluid under pressure, said source being connected with the first-mentioned steering valve, an adjustable pressure valve connected with said source, and a return flow pipe connected with said pressure valve, whereby the pressure of the jaws of said clamping device is dependent upon the adjustment of said adjustable pressure valve.

3. In a machine having a lubrication pump, a container for the lubricant and a clamping device comprising movable jaws, rotatable means carrying said jaws and moving them toward and away from each other, and a coupling element connected with said jaw-moving means; a drive for said clamping device, said drive comprising a rotatable and reciprocable coupling element adapted to engage the coupling element of said clamping device, means operated by the lubricant and connected with the coupling element of said drive for reciprocating the same, a steering valve comprising a cylinder and a valve body within said cylinder; a pipe connecting said cylinder with said coupling-reciprocating means, a pipe connecting said cylinder with said container for the lubricant, a pipe connecting said cylinder with said pump, said valve body having passages formed therein which transmit fluid from said pump to said coupling-reciprocating means and from said pump to said container for the lubricant in predetermined positions of said valve body, means operated by the lubricant and connected with the coupling element of said drive for rotating the same, another valve comprising a cylinder and a valve body within the cylinder; pipes connecting the cylinder of the second-mentioned valve with said coupling-rotating means, a pipe connecting the cylinder of the second-mentioned valve with the pipe connecting the cylinder of the first-mentioned valve with the container for the lubricant, a pipe connecting the cylinder of the second-mentioned valve with said coupling-reciprocating means, the valve body of the second-mentioned valve having passages formed therein which transmit fluid from said coupling-reciprocating means toward said coupling-rotating means and from said coupling-rotating means toward said container for the lubricant, and means operatively interconnecting the valve bodies of the two valves to cause said pump to transmit the lubricant selectively to the container and to the coupling-reciprocating and coupling-rotating means.

EWALD DORNHÖFER.